ns Patent Office 3,133,566
Patented May 19, 1964

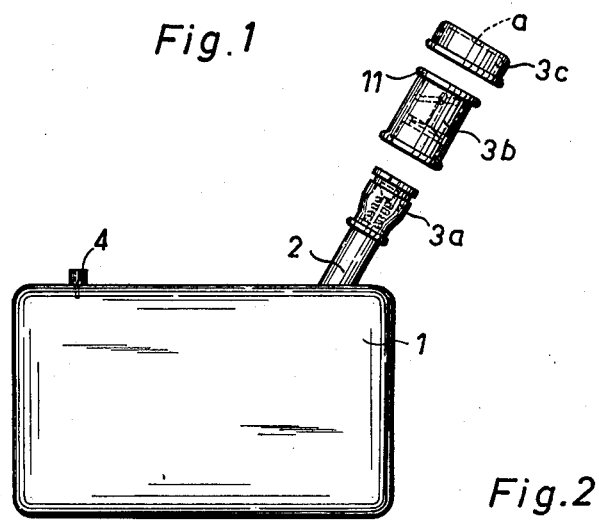
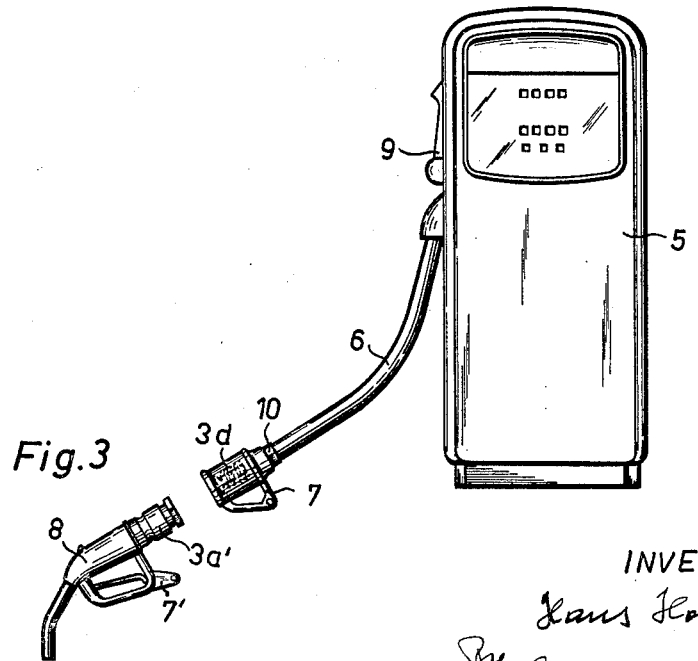

3,133,566
FUELING DEVICE
Hans Hoss, Rheydt-Rhineland, Germany, assignor to Scheidt & Bachmann Akt. Ges., Rheydt-Rhineland, Germany, a corporation of Germany
Filed Aug. 2, 1960, Ser. No. 47,095
Claims priority, application Germany Mar. 17, 1960
3 Claims. (Cl. 141—350)

The present invention relates to fueling devices in general and to such fueling devices, wherein the quantity of the liquid, removed through a nozzle valve which is manually operable and disposed at the end of a filling hose, is controlled by the nozzle valve, the latter being inserted into the open end of the filling sleeve of a fuel tank, in particular.

It is one object of the present invention to provide a fueling device for liquid fuels which provides a particularly advantageous design of the nozzle device, whereby, not only the operational safety is appreciably increased and fluid losses are completely avoided, but, in addition, the advantage is brought about that the danger of a fire and the soiling of underground water by penetration of fuel into the soil is avoided with complete safety.

Fueling devices of this type are known which have the drawback that due to a wrong evaluation of the capacity of the fuel tank or due to carelessness by the gas station operator, the fuel tank in the vehicle is overfilled, so that the danger is presented that the overpouring fuel either ignites or that it soils the underground water and the sewer system, if it is permitted to flow off.

It has been proposed before to avoid these drawbacks and dangers by having trained personnel serve at gas stations and by keeping such personnel under supervision, which measure, however, did not bring about the desirable, complete safety and, of necessity, cannot be relied upon, particularly if the gas stations are equipped, for instance, for self-service, such devices are extremely desirable in view of the time-saving, particularly since sufficiently trained personnel is not available, and also for reasons of rationalization for saving of expenses.

It is another object of the present invention to provide a fueling device which avoids the drawbacks and difficulties of the known devices, particularly in connection with self-service gas stations.

It is yet another object of the present invention to provide a fueling device, wherein the filling line of the fuel tank, on the one hand, and the nozzle hose extending from the gas station, on the other hand, is equipped with a valve-and-coupling element, which elements form jointly a complete hose coupling of known design, in such a manner that only upon complete coupling of the two coupling elements, the valves, disposed in the elements, can be opened and the feed of fluid is made possible.

The fueling device, designed in accordance with the present invention, has at first the advantage that, due to the fluid tight connection between the gas station and the fluid tank in the vehicle, the legal and safety requirements for the operation of gas stations are complied with, so that each user or driver of a vehicle is in position to serve himself or herself without disadvantage even after normal business hours of the gas stations.

Another advantage of the present invention resides in the fact that the fueling device contributes appreciably to the simplification and reduction of cost of the operations in gas stations during the normal business hours, since the operator in the gas station does not have to supervise anymore continuously the filling procedure and, instead, can perform services of other types, for instance cleaning the windshield, checking the oil in the engine or checking the tires.

Finally, the advantage exists also, according to which the termination of the filling procedure takes place fully automatically, when the tank is filled up, or, in case a part filling only is desired, by means of presetting devices of known structure.

With these and other objects in view, which will become apparent in the following detailed description, the present invention will be clearly understood in connection with the accompanying drawings, in which:

FIGURE 1 is a schematic elevation of a fuel tank of a vehicle with a filling line designed in accordance with the present invention;

FIG. 2 is a front elevation of a gas station pump indicating a hose emerging from the gas station pump and carrying a hose coupling element; and FIG. 3 is a front elevation of a nozzle hose valve extending from a fuel pump and complementary to the hose coupling element shown in FIG. 2.

Referring now to the drawings, and in particular to FIG. 1, a fuel tank 1 of a vehicle is disclosed which is equipped with a filling line 2. A coupling-element 3a is secured to the free end of the filling line 2. The coupling-element 3a includes a spring-biased valve of known design. An intermediate element 3b, which is also equipped with a spring-biased valve, can be coupled with the coupling element 3a.

The valves in the coupling element 3a and in the intermediate element 3b open relative to each other, upon coupling together these two elements.

A cover 3c is provided for closing the filling opening of the intermediate element 3b. The cover 3c has a bore "a" for entrance of air to the fuel tank 1 during the feeding of fuel to the vehicle engine. The air present in the fuel tank 1 escapes during the filling of fuel into the tank through a vent valve 4 disposed on top of the tank 1 at a point remote from the filling line 2.

Referring now to FIG. 2, it is quite apparent that the gas station pump 5 is equipped with a filling hose 6, the free end of which has a coupling element 3d which can be coupled with the coupling element 3a of the feeding line 2 to the tank 1 in the same manner as the intermediate element 3b and which contains likewise a spring-biased valve (not shown). The difference between the coupling element 3d and the intermediate element 3b resides in the formation of the respective ends. One end of the coupling element 3d is formed with an inner thread 10 which receives the filling hose 6, while one end of the intermediate element 3b is equipped with a threaded or bayonet guide 11 designed for securing the cover 3c thereto.

A nozzle valve 8 of known design is disclosed in FIG. 3, which nozzle valve 8 is equipped with a coupling element 3a' connected thereto by a threaded connection.

The nozzle valve 8 and the coupling element 3d have holding means 7 and 7', respectively, which serves the purpose of suspending the nozzle valve 8 and the coupling element 3d, respectively, on a suspending device 9, disposed laterally on the gas station pump 5, in case the latter is not in use.

The operation and function of the described fueling device differs, depending upon its use for vehicles with fuel tank closures of conventional structure and for vehicles with a fuel tank closure as disclosed in FIG. 1.

In order to fill fuel into vehicle tanks with closures of conventional design, the nozzle valve 8 is connected with the filling hose 6 by means of the coupling elements 3a' and 3d of the nozzle valve 8 and the filling line 6, respectively. The filling of the fuel tank takes place by the operator of the gas station in conventional manner. During non-business hours of the gas station, however, for instance during the night or on weekends, at which times the gas station is closed for service by an attendant, the nozzle valve 8 is removed by disconnecting the coupling elements 3a' and 3d and retained under lock, while the gas station pump 5 remains in servicing condition. Thus, the gas station is not useable during such idle periods for vehicles having the conventional tank filling lines.

Vehicles which are equipped, however, with a tank filling line 2, which is disclosed in FIG. 1, can use the gas station pump 5 also during such non-business or idle periods. In order to feed fuel into the fuel tank 1 of the vehicles, the driver removes for this purpose the protecting cap 3c and then the intermediate element 3b is removed from the coupling element 3a and the coupling element 3d (FIG. 2) secured to the filling hose 6 is then connected with the coupling element 3a secured to the filling line 2. Due to the joining of the coupling elements 3a and 3d, the respective valves, disposed in the coupling elements 3a and 3d, will open and upon insertion of a coin in a conventional collection device (not shown) provided in the gas station pump 5, the latter is rendered operative, and the feed of fuel into the fuel tank of a vehicle can be performed. After termination of the filling operation, the coupling elements 3a and 3d are disconnected and the coupling element 3d is suspended by its holding means 7 from the suspending device 9 of the gas station pump 5. The filling line 2 is then connected again with the intermediate element 3b and the latter is again closed up with the cover 3c.

During the normal business hours of the gas station, the operator of the gas station performs the service and fills the tank of the vehicles, which tank 1 is equipped with the filling line 2 disclosed in FIG. 1 to which the intermediate element 3b has been attached, in order to open the spring-biased valve disposed in the coupling element 3a.

Thus, the vehicles, the filling line of which is equipped with a device disposed in accordance with the present invention, may have the fuel tank filled from gas station pumps having a nozzle valve of conventional structure.

In order to bring about such operation, as stated above, the cover 3c is removed from the filling line 2. While the intermediate element 3b remains in connection with the coupling element 3a, the valves in these two elements are, thereby, in their open position. The conventional nozzle valve 8 is now inserted into the open end of the intermediate element 3b and the filling of the fuel tank takes place in conventional manner.

Summarily the following applications result from the present nozzle device for liquid fuels.

For gas stations permitting self-service, the coupling element 3d is always provided at the end of the filling hose 6. During non-business hours, only vehicles which are equipped with the coupling element 3a at the end of the filling line 2 can obtain self-service from these gas station pumps, at the same time providing all safety measures required for such operation.

During the time periods, that is, during business hours at which gas station attendants are available at the gas station, the nozzle valve 8 is connected with the filling hose 6 of the gas station pump 5, so that the filling of all vehicles, regardless of the type of filling line provided on their fuel tank, is made possible.

While I have disclosed several embodiments of the present invention, it is to be understood that these embodiments are given by example only and not in a limiting sense, the scope of the present invention being determined by the objects and the claims.

I claim:

1. A fueling device for feeding liquid fuel from a gas pump to a fuel tank of a vehicle comprising
   a gas pump,
   a filling hose extending from and connected with said gas pump,
   a first coupling element having a first spring biased valve therein and being secured to the free end of said filling hose,
   a nozzle having a second coupling element and including means for opening said first spring biased valve,
   said first coupling element being connectable with said second coupling element simultaneously opening said first spring biased valve for a free flow of said fuel from said filling hose to said nozzle,
   a fuel tank adapted to be mounted in a vehicle,
   a filling line extending from and being secured to said fuel tank,
   a third coupling element having a second spring biased valve therein and secured to the free end of said filling line,
   an intermediate fourth coupling element having means for opening said second spring biased valve opposite said second spring biased valve and being open at its opposite end,
   said first coupling element being connected selectively directly with said third coupling element to provide a direct connection between said first and third coupling elements and indirectly with said third coupling element by means of an intermediate connection of said first coupling element with said second coupling element and of said third coupling element with said fourth coupling element, to provide an indirect connection of said first coupling element with said third coupling element, and
   said first valve and said second valve being opened simultaneously and said nozzle being received in said open end of said fourth coupling element during said indirect connection between said first and third coupling elements.

2. The fueling device, as set forth in claim 1, which includes a cover closing selectively said third coupling member and the open end of said intermediate fourth coupling member, respectively.

3. The fueling device, as set forth in claim 2, wherein said cover has a bore for entrance of air into said fuel tank.

References Cited in the file of this patent

UNITED STATES PATENTS

| | | |
|---|---|---|
| 2,475,562 | Crews | July 5, 1949 |
| 2,638,916 | Scheiwer | Mar. 19, 1953 |
| 2,753,884 | Lindsay | July 10, 1956 |
| 2,843,162 | Stoyke et al. | July 15, 1958 |
| 2,989,091 | Lowenthal | June 20, 1961 |